(12) United States Patent
Shen et al.

(10) Patent No.: US 10,812,615 B2
(45) Date of Patent: Oct. 20, 2020

(54) CACHING METHOD, SYSTEM, DEVICE AND READABLE STORAGE MEDIA FOR EDGE COMPUTING

(71) Applicant: SOOCHOW UNIVERSITY, Suzhou (CN)

(72) Inventors: Gangxiang Shen, Suzhou (CN); Ning Wang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 16/348,486

(22) PCT Filed: Sep. 13, 2018

(86) PCT No.: PCT/CN2018/105345
§ 371 (c)(1),
(2) Date: May 8, 2019

(87) PCT Pub. No.: WO2019/119897
PCT Pub. Date: Jun. 27, 2019

(65) Prior Publication Data
US 2019/0260845 A1    Aug. 22, 2019

(51) Int. Cl.
*H04L 29/08* (2006.01)
*G06F 16/2457* (2019.01)
(Continued)

(52) U.S. Cl.
CPC ............ *H04L 67/289* (2013.01); *G06F 3/067* (2013.01); *G06F 3/0611* (2013.01);
(Continued)

(58) Field of Classification Search
CPC . H04L 67/289; H04L 45/121; H04L 67/2842; G06F 16/24578; G06F 3/0611; G06F 3/0644; G06F 3/0656; G06F 3/067
See application file for complete search history.

(56) References Cited

U.S. PATENT DOCUMENTS

| | | | | |
|---|---|---|---|---|
| 2003/0005457 A1* | 1/2003 | Faibish | ............ | H04N 21/26241 725/94 |
| 2014/0280679 A1* | 9/2014 | Dey | ........................ | H04L 65/80 709/213 |
| 2017/0034643 A1* | 2/2017 | Young | ..................... | H04W 4/60 |

FOREIGN PATENT DOCUMENTS

| | | |
|---|---|---|
| CN | 106534333 A | 3/2017 |
| CN | 107450982 A | 12/2017 |
| CN | 108121512 A | 6/2018 |

\* cited by examiner

*Primary Examiner* — Ruolei Zong
*Assistant Examiner* — Billy H Ng
(74) *Attorney, Agent, or Firm* — SZDC Law PC (57) ABSTRACT

The application discloses caching method, system and device of edge computing and computer readable storage medium, wherein the edge computing network is divided into a plurality of zones each including a plurality of sub-zones. Each sub-zone corresponds to an edge computing node, which is divided into local sub-zone storage space and zone-shared storage space. Depending on the popularity for respective information data, they are stored into the local sub-zone storage space and zone-shared storage space in respective edge computing nodes, in order to optimize cooperative processing of user access requests across nodes, reduce the delivery latency, and maximize utilization of the processing capacity and storage space. Through constant adjustments to the size of local sub-zone storage space and changes to the distribution of information data, the storage distribution data at shortest average delivery latency is obtained, so as to achieve the minimum average delivery latency. (FIG. 1)

6 Claims, 2 Drawing Sheets

(51) Int. Cl.
*H04L 12/727* (2013.01)
*G06F 3/06* (2006.01)
(52) U.S. Cl.
CPC .......... *G06F 3/0644* (2013.01); *G06F 3/0656* (2013.01); *G06F 16/24578* (2019.01); *H04L 45/121* (2013.01); *H04L 67/2842* (2013.01)

CACHING METHOD, SYSTEM, DEVICE AND READABLE STORAGE MEDIA FOR EDGE COMPUTING

This application is the National Stage Application of PCT/CN2018/105345, filed on Sep. 13, 2018, which claims priority to Chinese Patent Application No.: 201711407289.9, filed on Dec. 22, 2017, which is incorporated by reference for all purposes as if fully set forth herein.

FIELD OF THE INVENTION

The present application belongs to the technical field of communication network, and particularly relates to a caching method, system, device and computer readable storage media for edge computing.

BACKGROUND OF THE INVENTION

With growing mobile data traffic and increasing IoT devices access, huge access capacity and low latency are required to connect nodes for real-time communications. Fiber-optics communication promises large capacity for X-hauling wireless access networks using integrated Fiber-Wireless (FiWi) access. Cloud-Radio Access Network (C-RAN) is one such integrated FiWi access network to realize future 5G access. For good Quality of Experience (QoE), latency (the time from a source sending a packet to the source receiving a packet from a destination) is an important performance parameter in a 5G network, which users need to access quickly. This leads to the new network scenario of Mobile Edge Computing (MEC), so as to decrease wait times significantly for users and reduce the pressure of the backhaul network. Edge computing enables users' requests to be quickly responded by deploying a large number of servers or micro data centers at the edge of the network (such as BBU nodes, access gateways in the residence), without having to seek services via multiple carrier networks and backbone networks, which can greatly improve the user experience while reducing the traffic on the backhaul network and the backbone network. However, there is huge data on the Internet while the computing/storage capacity of the edge computing node is very limited compared to that of the large data center.

It is important to propose a technical solution to maximize the benefits on limited resources, and it is a subject to study the content caching and delivery method for the edge computing, so as to provide as many services to the local users as possible and minimize the average content delivery latency.

SUMMARY OF THE INVENTION

In view of this, it is an objective of the present invention to provide a caching method, system, device and a computer readable storage media for edge computing that can improve the user experience and reduce an average delivery latency for the user by adopting the specific solutions as follows.

An information caching method for edge computing comprises the following steps:

Step S11: firstly, ranking information data in each sub-zone from the highest to the lowest according to their popularity; and then storing the information data from the highest to the lowest according to their ranks into local sub-zone storage space in a corresponding edge computing node until it becomes full;

Step S12: ranking information data from the highest to the lowest according to their popularity in a whole zone of all information data, and the current information data to be cached is each stored into a selected edge computing node until all the edge computing nodes become full, wherein the selected edge computing nodes are nodes that have free zone-shared storage space and have the highest access weights for the current information data to be cached;

Step S13: calculating current average delivery latency for a user accessing the information data in the current zone, and adjusting the size of the local sub-zone storage space in each edge computing node within the current zone with a preset increment value, and carrying out Step S11 and Step S12 again to calculate average delivery latency after adjustment;

Step S14: obtaining an amount of change of the average delivery latency by using the current average delivery latency and the average delivery latency after adjustment and determining whether the amount of change of the average delivery latency satisfies a preset condition;

Step S15: if so, outputting the storage distribution data for the information data stored in all the edge computing nodes within the zone with the lowest average delivery latency;

Step S16: if not, adjusting the size of the local sub-zone storage space in each edge computing node by using the current average delivery latency and the average delivery latency after adjustment, and carrying out Step S11 to Step S14 again;

wherein, each sub-zone contains an edge computing node, and each zone contains S sub-zones, wherein S is a positive integer, and the total storage space in each edge computing node includes local sub-zone storage space and zone-shared storage space.

Optionally, the zone-wide popularity for all the information data is calculated by substituting an average user request arrival rate of each edge computing node and a popularity for each information data calculated statistically for each sub-zone into an equation for calculating the zone-wide popularity expressed as:

$$G_c = \sum_{s \in S} p_{c,s} * \lambda_s;$$

wherein $G_c$ represents the zone-wide popularity for a c-th information data, $P_{c,s}$ represents the popularity of the information data c by a user group in the sub-zones, $\lambda_s$ represents the average user request arrival rate of the edge computing nodes in the sub-zones, $$\sum_{c \in C} p_{c,s} = 1,$$

$c \in C$, $s \in S$, C represents the total number of information data in the data center, and S represents a total number of edge computing nodes, C and S are both positive integers.

Optionally, the process of storing each remaining specific information data into a selected edge computing node comprises:

screening all the edge computing nodes to find edge computing nodes having remaining free zone-shared storage space so as to obtain a candidate node set;

substituting the average user request arrival rate of each edge computing node in the candidate node set and the popularity for the information data by each sub-zone into an equation for calculating an access weight to calculate the access weight for the current information data to be saved in each edge computing node in the candidate node set;

storing the current specific information data to the edge computing node with the highest access weight, wherein the equation for calculating the access weight is expressed as $Y_{c,s} = \lambda_s * p_{c,s}$;

wherein $Y_{c,s}$ represents the access weight for the c-th information data in the sub-zones.

Optionally, the process of storing the current specific information data into the edge computing node with the highest access weight comprises:

determining whether there are a plurality of edge computing nodes with the same highest access weight for this specific information data;

if so, substituting the average user request arrival rate of each edge computing node and the popularity for the information data that has been stored into each edge computing node, among the edge computing nodes with the same highest access weight, into an equation for calculating an access stress to calculate the access stress on each edge computing node;

substituting the access weight and the access stress on each edge computing node, among the plurality of edge computing nodes with the highest access weight, into an equation for calculating a pre-estimated access stress to calculate the pre-estimated access stress on each edge computing node;

storing the current specific information data into the edge computing node with the highest access weight and the lowest pre-estimated access stress; wherein the equation for calculating the access stress is expressed as:

$$W_s = \sum_{L_{m,s}} p_{c,s} * \lambda_s, \forall s \in S;$$

the equation for calculating the pre-estimated access stress is expressed as:

$$W'_s = W_s + Y_{c,s}, \forall s \in S;$$

wherein $W_s$ represents the access stress on an edge computing node within the sub-zones, $L_{m,s}$ represents the current set of information data stored in the edge computing node within the sub-zones, and $W'_s$ represents the pre-estimated access stress on the edge computing node within the zones.

Optionally, the process of adjusting the size of the local sub-zone storage space in each edge computing node by using the current average delivery latency and the average delivery latency after adjustment comprises:

substituting the current average delivery latency and the average delivery latency after adjustment into an equation for refreshing the storage space to calculate the size of the local sub-zone storage space in each edge computing node; wherein the equation for refreshing the storage space is expressed as:

$$M_2 = \left[ M_0 + \frac{\Delta m}{2} + \alpha \frac{J_{M_0} - J_{M_0 + \Delta m}}{\Delta m} \right];$$

wherein $M_2$ represents the size of the local sub-zone storage space in each edge computing node that has been adjusted by using the current average delivery latency and the adjusted average delivery latency, $M_0$ represents the size of the local sub-zone storage space in each edge computing node within the current zone, $\Delta m$ represents a preset increment value, $\alpha$ represents a preset increment coefficient, $J_{M_0}$ represents the current average delivery latency, and $J_{M_0 + \Delta m}$ represents the adjusted average delivery latency.

The present invention further discloses a caching system for edge computing, comprising a local storage module, for, firstly, ranking information data in each sub-zone from the highest to the lowest according to their popularity; and then storing the information data from the highest to the lowest according to their ranks into local sub-zone storage space in a corresponding edge computing node until it becomes full;

a shared storage module, for, ranking information data from the highest to the lowest according to their popularity in a whole zone of all information data in a data center, and the current information data to be cached are each stored into a selected edge computing node until all the edge computing nodes become full, wherein the selected edge computing nodes are nodes that have free zone-shared storage space and have the highest access weight for the current information data to be cached.

a latency recalculating module, for calculating current average delivery latency for a user accessing the information data in the current zone, and adjusting the size of the local sub-zone storage space in each edge computing node within the current zone with a preset increment value, and reloading the local storage module and the shared storage module successively to calculate an average delivery latency after adjustment;

a judgment module, for obtaining an amount of change of the average delivery latency by using the current average delivery latency and the average delivery latency after adjustment and determining whether the amount of change of the average delivery latency satisfies a preset condition;

an output module, for, if so, outputting the storage distribution data for the information data stored in all the edge computing nodes within the zone after adjustment;

a loop module, for, if not, adjusting the size of the local sub-zone storage space in each edge computing node by using the current average delivery latency and the average delivery latency after adjustment, and reloading the local storage module, the shared storage module, the latency recalculating module and the judgment module successively;

Each sub-zone contains an edge computing node, and each zone contains S sub-zones, wherein S is a positive integer, and the total storage space in each edge computing node includes local sub-zone storage space and zone-shared storage space.

Optionally, the shared storage module comprises:

a screening unit, for screening all the edge computing nodes to find edge computing nodes having remaining free zone-shared storage space so as to obtain a candidate node set;

an access weight calculating unit, for substituting the average user request arrival rate of each edge computing node in the candidate node set and the popularity for the information data by each sub-zone into an equation for calculating an access weight to calculate the access weight for the current information data to be saved in each edge computing node in the candidate node set;

a saving unit, for storing the current information data to be saved to the edge computing node with the highest access weight, wherein the equation for calculating the access weight is expressed as $Y_{c,s}=\lambda_s * p_{c,s}$;

wherein $Y_{c,s}$ represents the access weight for the c-th information data in the sub-zone s.

Optionally, the loop module comprises:

a storage space refreshing unit, for substituting the current average delivery latency and the average delivery latency after adjustment into an equation for refreshing the storage space to calculate the size of the local sub-zone storage space in each edge computing node; wherein the equation for refreshing the storage space is expressed as:

$$M_2 = \left[ M_0 + \frac{\Delta m}{2} + \alpha \frac{J_{M_0} - J_{M_0+\Delta m}}{\Delta m} \right];$$

wherein $M_2$ represents the size of the local sub-zone storage space in each edge computing node that has been adjusted by using the current average delivery latency and the adjusted average delivery latency, $M_0$ represents the size of the local sub-zone storage space in each edge computing node within the current zone, $\Delta m$ represents a preset increment value, $\alpha$ represents a preset increment coefficient, $J_{M_0}$ represents the current average delivery latency, and $J_{M_0+\Delta m}$ represents the adjusted average delivery latency.

The present invention further discloses a caching device for edge computing, comprising:

a storage, for storing instructions, wherein the instructions comprises the following steps: Step S11: firstly, ranking information data in each sub-zone from the highest to the lowest according to their popularity; and then storing the information data from the highest to the lowest according to their ranks into local sub-zone storage space in a corresponding edge computing node until it becomes full; Step S12: ranking information data from the highest to the lowest according to their popularity in a whole zone of all information data in a data center, and the current information data to be cached are each stored into a selected edge computing node until all the edge computing nodes become full, wherein the selected edge computing nodes are nodes that have free zone-shared storage space and have the highest access weight for the current information data to be cached; Step S13: calculating current average delivery latency for a user accessing the information data in the current zone, and adjusting the size of the local sub-zone storage space in each edge computing node within the current zone with a preset increment value, and carrying out Step S11 and Step S12 again to calculate an average delivery latency after adjustment; Step S14: obtaining an amount of change of the average delivery latency by using the current average delivery latency and the average delivery latency after adjustment and determining whether the amount of change of the average delivery latency satisfies a preset condition; Step S15: if so, outputting the storage distribution data for the information data stored in all the edge computing nodes within the zone with the lowest average delivery latency; Step S16: if not, adjusting the size of the local sub-zone storage space in each edge computing node by using the current average delivery latency and the average delivery latency after adjustment, and carrying out Step S11 to Step S14 again, wherein each sub-zone contains an edge computing node, and each zone contains S sub-zones, wherein S is a positive integer, and the total storage space in each edge computing node includes local sub-zone storage space and zone-shared storage space;

a processor, for executing the instructions in the storage.

The present invention further discloses a computer readable storage medium having a caching program for edge computing stored therein which, when executed by a processor, implements the steps of a caching method of edge computing as described above.

In the present invention, the caching method for edge computing comprises the following steps: Step S11: firstly, ranking information data in each sub-zone from the highest to the lowest according to their popularity; and then storing the information data from the highest to the lowest according to their ranks into local sub-zone storage space in a corresponding edge computing node until it becomes full; Step S12: ranking information data from the highest to the lowest according to their popularity in a whole zone of all information data in a data center, and the current information data to be cached are each stored into a selected edge computing node until all the edge computing nodes become full, wherein the selected edge computing nodes are nodes that have free zone-shared storage space and have the highest access weight for the current information data to be cached; Step S13: calculating current average delivery latency for a user accessing the information data in the current zone, and adjusting the size of the local sub-zone storage space in each edge computing node within the current zone with a preset increment value, and carrying out Step S11 and Step S12 again to calculate an average delivery latency after adjustment; Step S14: obtaining an amount of change of the average delivery latency by using the current average delivery latency and the average delivery latency after adjustment and determining whether the amount of change of the average delivery latency satisfies a preset condition; Step S15: if so, outputting the storage distribution data for the information data stored in all the edge computing nodes within the zone with the lowest average delivery latency; Step S16: if not, adjusting the size of the local sub-zone storage space in each edge computing node by using the current average delivery latency and the average delivery latency after adjustment, and carrying out Step S11 to Step S14 again, wherein each sub-zone contains an edge computing node, and each zone contains S sub-zones, wherein S is a positive integer, and the total storage space in each edge computing node includes local sub-zone storage space and zone-shared storage space.

In the present invention, the edge computing network is divided into a plurality of zones each including a plurality of sub-zones. Each sub-zone corresponds to an edge computing node. Each edge computing node is divided into local sub-zone storage space and zone-shared storage space. Depending on the popularity for various information data in various sub-zones, the information data is stored into the local sub-zone storage space and zone-shared storage space in respective edge computing nodes according to a particular computing mode, in order to optimize cooperative processing of user access requests across nodes, reduce the delivery latency for the user, and maximize utilization of the processing capacity and storage space of the edge computing nodes. Finally, through constant adjustments to the size of the local sub-zone storage space and changes to the distribution of information data stored in the edge computing node, the storage distribution data for the information data stored in the edge computing node at an optimum average delivery latency for the user is obtained, so as to achieve the minimum average delivery latency for the user.

BRIEF DESCRIPTION OF THE DRAWINGS

For clearer explanation of the embodiments of the present invention or the technical solutions from the prior art, the drawings needed in description of the embodiments or the prior art will be described briefly in the following. It is apparent that the drawings described below illustrate only the embodiment of the present invention. Other drawings can be achieved based on the presented drawings by a person of ordinary skill in the art without creative efforts.

DETAILED DESCRIPTION OF THE EMBODIMENTS

The technical solutions in the embodiments of the present invention will be described clearly and completely in the following with reference to the accompanying drawings in the embodiments of the present invention. It is apparent that the embodiments described are only some of the embodiments of the present invention, but not all the embodiments thereof. All other embodiments achieved by a person of ordinary skill in the art based on the embodiments of the present invention without creative efforts shall fall within the scope of the present invention.

Figure 1:
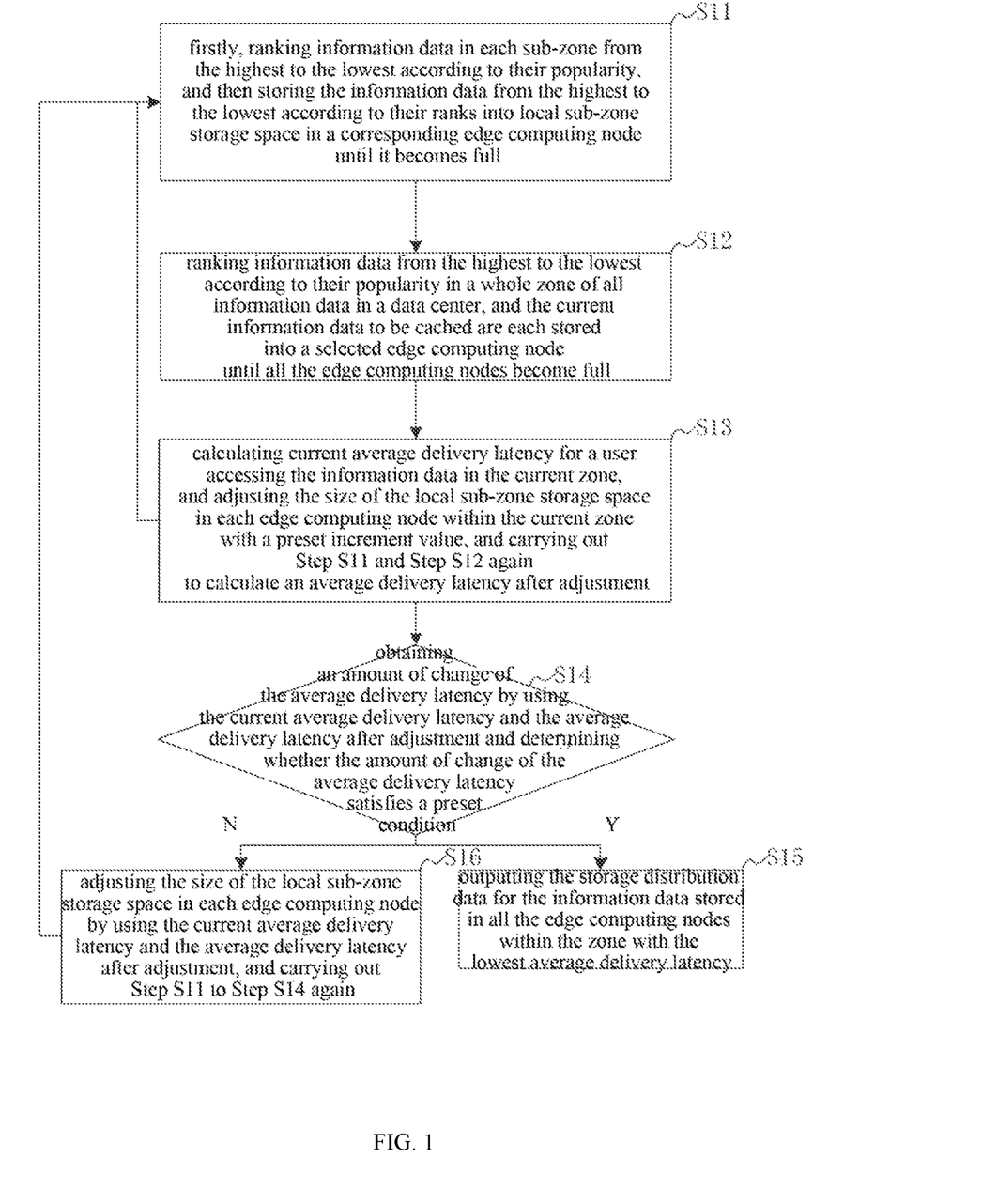
FIG. 1 shows a flowchart of a caching method of edge computing according to an embodiment of the present invention.

An embodiment of the present invention discloses a caching method of edge computing. As shown in FIG. 1, the method comprises the following steps:

Step S11, firstly, ranking information data in each sub-zone from the highest to the lowest according to their popularity; and then storing the information data from the highest to the lowest according to their ranks into local sub-zone storage space in a corresponding edge computing node until it becomes full. Specifically, in an architecture of edge computing services, the network in a zone has three parts-fronthaul, mid-haul, and backhaul. In this architecture, the fronthaul has multiple radio nodes connected to a Distributed Unit (DU), the mid-haul connects multiple DUs to a Central Unit (CU), and finally the backhaul connects multiple CUs to a core network via a core switch node. Generally, a large data center is placed near the core node and connected to the core network.

In an embodiment of the present invention, a C-RAN network is divided into a zone including a CU and multiple DUs. Each zone is subdivided into multiple sub-zones with each sub-zone having a DU and multiple radio nodes. That is, each sub-zone includes an edge computing node and each zone includes S sub-zones, wherein S is a positive integer. The backhaul includes multiple zones, and the edge computing nodes in each zone can be accessed by each other. If an edge computing node that has received an access request from a user does not cache the c information data, the access request from the user is sent to other edge computing nodes in the same zone, to handle forwarding of the requests. The edge computing nodes in the same zone cooperate to serve user requests.

It should be understood that a sub-zone has an edge computing node and an edge computing node corresponds to a user group in the zone. Due to differences between users, the same information data has different popularities in different user groups. For example, NO. 5 information data may have a popularity of 0.3 by the users in the sub-zone1 and a popularity of 0.35 in the sub-zone 2.

Specifically, a general popularity for different information data by a user group in each sub-zone can be calculated statistically in advance. A higher popularity for data indicates a higher user access frequency. Therefore, to improve the access speed for the user, each sub-zone caches the information data in the sequence of popularity from the highest to the lowest, into predefined local sub-zone storage space in a corresponding edge computing node until it becomes full. For example, the popularities for respective information data by a user group in a sub-zone are numbered and ranked as: 0.2, 0.3, 0.15, 0.12, 0.13, 0.05, . . . . The sum of the popularities for the information data is equal to 1, and the local sub-zone storage space in the edge computing node in the sub-zone is 3. Then, in the sequence of popularities from the highest to the lowest, information data numbered as 2, 1, and 3 are stored into the local sub-zone storage space in the edge computing nodes in the sub-zone.

It is to be noted that, the total storage space in each edge computing node includes local sub-zone storage space and zone-shared storage space. The local sub-zone storage space is predefined storage space that is smaller than the total storage space. The size of the zone-shared storage space is equal to the difference between the total storage space and the local sub-zone storage space. The initial size of the local sub-zone storage space may be set at random.

Step S12: ranking information data from the highest to the lowest according to their popularity in a whole zone of all information data, and the current information data to be cached are each stored into a selected edge computing node until all the edge computing nodes become full, wherein the selected edge computing nodes are nodes that have free zone-shared storage space and have the highest access weight for the current information data to be cached;

The data center contains all the information data in the whole edge computing network. The zone-wide popularities for all the information data in the data center is calculated in order to identify the hotness of the information data, so that the information data with a high hotness, i.e., a high popularity, is subsequently stored into the edge computing node. In this way, the access speed is improved and the delivery latency is reduced. The information data that has not been cached into the current zone in Step S11, i.e., the current information data to be cached, are cached in the sequence of their zone-wide popularities from the highest to the lowest into the edge computing node having remaining free zone-shared storage space and having the highest access weight for the information data among the edge computing nodes, until all the edge computing nodes become full.

Specifically, it is determined through traversing which of all the information data in the data center has been cached in the current zone. Apparently, traversing of all the information data in the data center is performed in the sequence of their zone-wide popularities from the highest to the lowest to ensure that data with high zone-wide popularities is cached in the edge computing node.

Specifically, if there is any information data that has not been cached into the current zone, an edge computing node with remaining zone-shared storage space is selected from the zone. For example, there are 3 edge computing nodes in the zone. The zone-shared storage space in a first edge computing node has 5 remaining positions, the zone-shared storage space in a second edge computing node has 10 remaining positions, and the zone-shared storage space in a third edge computing node has 0 remaining position. Then the edge computing node with the highest access weight for the information data is selected from the first and second edge computing nodes. It should be understood that, as the information data with a high popularity in the data center is continuously cached into the edge computing nodes during traversing, some edge computing nodes may get relatively much information data, and thus run out of free zone-shared storage space sooner. Therefore, the zone needs to be screened to find edge computing nodes with remaining zone-shared storage space.

Specifically, since there may be a plurality of edge computing nodes in the zone that has remaining zone-shared storage space, the edge computing node with the highest access weight for the information data to be cached is preferentially selected. Since the information data is cached into different edge computing nodes and these different edge computing nodes correspond to different user groups, different number of accesses, and different popularities, the access weight for the information data in different edge computing nodes can be calculated. Preferential selection of the edge computing node with a high access weight means that the information data can be accessed by the user more frequently in this edge computing node, thereby reducing delivery latency for the user and improving user experience.

Step S13: calculating current average delivery latency for a user accessing the information data in the current zone, and adjusting the size of the local sub-zone storage space in each edge computing node within the current zone with a preset increment value, and carrying out Step S11 and Step S12 again to calculate an average delivery latency after adjustment;

Specifically, once the local sub-zone storage space and zone-shared storage space in all edge computing nodes in the zone have been filled with cached information data, simulation is performed to calculate the current average delivery latency for the current user accessing the information data, based on the storage distribution of the information data cached in the edge computing nodes in the current zone. Then the size of the local sub-zone storage space in each edge computing node in the current zone is adjusted by using a preset increment value and an increment equation in order to obtain adjusted local sub-zone storage space in each edge computing node in the zone. The processes in Step S11 and Step S12 are performed again to obtain an adjusted storage distribution of information data in all edge computing nodes in the zone. Then simulation is performed again to calculate an adjusted average delivery latency for the user accessing the information data after adjustment, based on the adjusted storage distribution of the information data in all edge computing nodes in the zone.

The increment equation is expressed as: $M_1=M_0+\Delta m$;

wherein $M_1$ represents the adjusted local sub-zone storage space in each edge computing node in the zone.

Step S14: obtaining an amount of change of the average delivery latency by using the current average delivery latency and the average delivery latency after adjustment and determining whether the amount of change of the average delivery latency satisfies a preset condition Specifically, comparison or computation is performed with the current average delivery latency and the adjusted average delivery latency to obtain the amount of variation in the average delivery latency. Further, it is determined whether the amount of variation in the average delivery latency satisfies a preset condition. For example, the amount of variation in the average delivery latency may be indicated by the slope of the average delivery latency. The relationship between the local sub-zone storage space and the average delivery latency of each edge computing node has a profile with a concave curved distribution in which a steady segment of the curve indicates a minimum average delivery latency and a lower slope indicates an average delivery latency closer to the minimum. As such, the slope of the average delivery latency can be obtained by using the current average delivery latency and the adjusted average delivery latency. Then it is determined whether the slope satisfies a preset range. In this way, the storage distribution data for the information data cached in all edge computing nodes in the optimum zone is obtained. Alternatively, it may be determined whether a preset number of cycles have been reached, for example, whether the amount of variation in the average delivery latency has been calculated by the 50th time.

Step S15: if so, outputting the storage distribution data for the information data stored in all the edge computing nodes within the zone with the lowest average delivery latency.

Specifically, if the preset condition is satisfied, the storage distribution data for the information data cached in respective edge computing nodes in the zone at the lowest average delivery latency is output. It should be understood that different average access latencies may result from repeated adjustments to the size of the local sub-zone storage space in each edge computing node. Therefore, when the amount of variation in the average delivery latency satisfies the preset condition, the storage distribution data for the information data at the lowest average delivery latency is output as the optimum result.

Step S16: if not, adjusting the size of the local sub-zone storage space in each edge computing node by using the current average delivery latency and the average delivery latency after adjustment, and carrying out Step S11 to Step S14 again.

Specifically, if the preset condition is not satisfied, the size of local sub-zone storage space in each edge-computing node is adjusted by using the current average delivery latency and the adjusted average delivery latency, and information data in each edge-computing node is cleaned up. In accordance with the processes in Steps S11 and S12, the information data is cached into each edge computing node again. Then via Steps S13 and S14, an amount of variation in the average latency is obtained, and it is determined whether the amount of variation in the average latency calculated from the adjusted storage distribution of the information data cached in the edge computing nodes in the zone satisfies the preset condition. If not, it is decided to perform Step S15 or S16 again. Finally, if the amount of variation in the average latency satisfies the preset condition, Step S14 is performed to output the adjusted storage distribution data for the information data cached in all the edge computing nodes in the zone.

It can be seen that in the embodiment of the present invention, the edge computing network is divided into multiple zones, each including multiple sub-zones. Each sub-zone corresponds to an edge computing node. Each edge computing node is divided into local sub-zone storage space and zone-shared storage space. Depending on the popularity for respective information data in respective sub-zones, the information data is cached into the local sub-zone storage space and zone-shared storage space in respective edge computing node according to a particular computing mode, in order to optimize cooperative processing of user access requests across nodes, reduce the delivery latency for the user, and maximize utilization of the processing capacity and storage space of the edge computing nodes. Finally, through constant adjustments to the size of the local sub-zone storage space and changes to the distribution of information data cached in the edge computing node, the storage distribution data for the information data cached in the edge computing node at an optimum average delivery latency for the user is obtained, so as to achieve the minimum average delivery latency for the user.

An embodiment of the present invention discloses a caching method of edge computing. Further explanation and optimization are made to the technical solutions in this embodiment compared with the embodiments described above. Specifically:

In this embodiment of the present invention, the zone-wide popularity for all the information data in the data center is calculated by substituting the average user request arrival rate of each edge computing node and the popularity for respective information data calculated statistically for each sub-zone into an equation for calculating the zone-wide popularity.

Specifically, a weighted sum is calculated for individual information data in the following manner by using the average user request arrival rate calculated in advance for each edge computing node and popularity distribution for these information data calculated in advance for each edge computing node, to obtain the zone-wide popularity for each information data.

The equation for calculating the zone-wide popularity is expressed as $$G_c = \sum_{s \in S} p_{c,s} * \lambda_s;$$

wherein $G_c$ represents the zone-wide popularity for a c-th information data, $p_{c,s}$ represents the popularity for the information data c by a user group in the sub-zones, $\lambda_s$ represents the average user request arrival rate of the edge computing nodes in the sub-zones, $$\sum_{c \in C} p_{c,s} = 1,$$

$c \in C$, $s \in S$, C represents the total number of information data in the data center, and S represents a total number of edge computing nodes, wherein C and S are both positive integers.

For example, there are two edge computing nodes, 4 types of information data, the average user request arrival rate $\lambda_1$ of a first edge computing node is 100, and the average user request arrival rate $\lambda_2$ of a second edge computing node is 120. The popularity for individual information data in individual edge computing node is shown in Table 1 which illustrates the popularity distribution for the information data. The average user request arrival rate of the edge computing node and a corresponding popularity for the information data are substituted into the equation for calculating the zone-wide popularity for weight summation to obtain the zone-wide popularity for the information data. For example, assume that the popularity for the first information data in a first edge computing node is 0.4, the popularity for the first information data in a second edge computing node is 0.3, $\lambda_1$ is 100, and $\lambda_2$ is 120, then the node popularity for the first information data in the first edge computing node is calculated as 40, the node popularity for the first information data in the second edge computing node is calculated as 36, and thus the zone-wide popularity for the information data is 76.

TABLE 1

| Information Data | First Information Data | Second Information Data | Third Information Data | Fourth Information Data |
|---|---|---|---|---|
| First edge computing node | 0.4 | 0.1 | 0.2 | 0.3 |
| Second edge computing node | 0.3 | 0.3 | 0.2 | 0.2 |

In this embodiment of the present invention, the process of caching each information data to be cached into the selected edge computing node may include Steps S21 to S23 as follows.

Step S21, screening all the edge computing nodes to find edge computing nodes with remaining free zone-shared storage space so as to obtain a candidate node set.

Step S22, substituting the average user request arrival rate of each edge computing node in the candidate node set and the popularity for the information data in each sub-zone into the equation for calculating the access weight, to calculate the access weight for the current information data to be cached in each edge computing node in the candidate node set.

Specifically, the average user request arrival rate of each edge computing node and the popularity for each information data in each sub-zone that has been calculated statistically in advance are substituted into an equation for calculating the access weight to calculate the access weight for the current information data to be cached in each edge computing node.

The equation for calculating the access weight is expressed as $Y_{c,s} = \lambda_s * p_{c,s}$;

wherein, $Y_{c,s}$ represents the access weight for the c-th information data in the sub-zones.

For example, assume that the average user request arrival rate of the first edge computing node is 110, the average user request arrival rate of the second edge computing node is 120, and the popularities for the information data in the first and second edge computing nodes are both 0.2, then by substituting them into the equation for calculating the access weight, the access weight for the first edge computing node is calculated as 22, and the access weight for the second edge computing node is calculated as 24.

Step S23, caching the current information data to be cached is stored into the edge computing node with the highest access weight.

In this embodiment of the present invention, the process of storing the current information data to be cached into the edge computing node with the highest access weight in Step S23 may comprise specifically Steps S231 to S234 as follows.

Step S231, determining whether there is a plurality of edge computing nodes with the same highest access weight.

Specifically, in practice, there may be a plurality of edge computing nodes with the same highest access weight for the current information data to be cached. For example, the access weights for the first information data in the first and second edge computing nodes are both 22, and are higher than those in other edge computing nodes. In this case, a further determination condition needs to be added in order to select an edge computing node from the edge computing nodes with the same access weight for storing the information data.

Step S232, if there is a plurality of edge computing nodes with the same highest access weight, the average user request arrival rate of each edge computing node and the popularity for the information data stored into each edge computing node, among the multiple edge computing nodes with the same highest access weight, are substituted into the equation for calculating the access stress to calculate the access stress for each edge computing node.

Specifically, the access stress for each edge computing node is calculated by using the equation for calculating the access stress and the average user request arrival rate of each edge computing node and the popularity for the information data stored in each edge computing node that have been calculated statistically in advance.

The equation for calculating the access stress is expressed as $$W_s = \sum_{L_{m,s}} p_{c,s} * \lambda_s, \forall s \in S;$$

wherein $W_s$ represents the access stress for the edge computing nodes in the sub-zones, and $L_{m,s}$ represents the current set of information data stored in the edge computing nodes in the sub-zones.

For example, the first and second information data have been stored in the first edge computing node, and the second and fourth information data have been stored in the second edge computing node. Assume that the average user request arrival rate of the first edge computing node is 100, the average user request arrival rate of the second edge computing node is 120, the popularity for the first information data in the first edge computing node is 0.4, the popularities for the second information data in the first and second edge computing nodes are respectively 0.3 and 0.3, and the popularity for the fourth information data in the second edge computing node is 0.3, then the access stress on the first edge computing node is 70 and the access stress on the second edge computing node is 72.

In Step S233, the access weight of each edge computing node and the access stress on each edge computing node among the multiple edge computing nodes with the highest access weight are substituted into the equation for calculating a pre-estimated access stress to calculate the pre-estimated access stress on each edge computing node.

The equation for calculating the pre-estimated access stress is expressed as $$W'_s = W_s + Y_{c,s}, \forall s \in S;$$

wherein $W'_s$ represents the pre-estimated access stress on the edge computing nodes in the zones.

For example, assume that the access stress on the first edge computing node is 70, the access stress on the second edge computing node is 72, and the access weights for the third data in the first and second edge computing nodes are both 22, then the pre-estimated access stress on the first edge computing node is 92, and the pre-estimated access stress on the edge computing node is 94.

Step S234, storing the current information data to be cached into the edge computing node with the highest access weight and the lowest pre-estimated access stress.

In the embodiment described above, the process of adjusting the size of local sub-zone storage space in each edge computing node by using the current average delivery latency and the adjusted average delivery latency may specifically comprise substituting the current average delivery latency and the adjusted average delivery latency into the equation for refreshing the storage space to calculate the size of local sub-zone storage space in each edge computing node.

Specifically, when it is determined that the amount of variation in the average delivery latency does not satisfy the preset condition, the current average delivery latency and the adjusted average delivery latency are substituted into the equation for refreshing the storage space to recalculate the size of local sub-zone storage space in each edge computing node, so at to obtain the new average delivery latency for the user by storing the information data into the edge computing node again.

The equation for refreshing the storage space is expressed as:

$$M_2 = \left[ M_0 + \frac{\Delta m}{2} + \alpha \frac{J_{M_0} - J_{M_0 + \Delta m}}{\Delta m} \right];$$

wherein $M_2$ represents the size of the local sub-zone storage space in each edge computing node that has been adjusted by using the current average delivery latency and the adjusted average delivery latency, $M_0$ represents the size of the local sub-zone storage space in each edge computing node in the current zone, $\Delta m$ represents a preset increment value, $\alpha$ represents a preset increment coefficient, $J_{M_0}$ represents the current average delivery latency, and $J_{M_0 + \Delta m}$ represents the adjusted average delivery latency.

It should be understood that the process of recalculating the size of the local sub-zone storage space in each edge computing node further includes rounding.

It is to be noted that the effectiveness of this algorithm may be verified by using an MILP model. The sets, parameters, and variables for this are defined as follows. C is the set of content items, S is the set of edge computing nodes in a single zone, and the parameters $s_i$ and $c_i$ ($i \in S$) are the respective maximum storage space and processing capacity of each edge computing node. Here the processing capacity is derived from the computing capacity of the CPU and the transmission capacity of the link connected to the edge computing node. A bottleneck one is chosen as the maximum processing capacity of the server, indicating that this edge computing node can serve up to $c_i$ user requests at the same time. Therefore, when the number of requests served by the edge computing node at the same moment reaches $c_i$, the server is fully loaded. The parameter $\lambda_i$ is the user request arrival rate of the sub-zone i ($i \in S$), and this arrival rate is subject to Poisson distribution. The parameter $\rho_k^i$ ($i \in S, k \in C$) represents the popularity of content item k in the sub-zone i, which follows the Zip flaw. Finally, in correspondence with three different scenarios, the parameters $L_1$, $L_2$, and $L_3$ are used to represent respectively delivery latencies in these three scenarios. In general, $L_3 \gg L_2 > L_1$. $^{\text{a}}$ is a constant and is a large value. For variables, $\rho_k^i$ ($i \in S, k \in C$) is a binary variable that equals 1 if the content item k is cached in the edge computing node i and is otherwise equal to 0. $\psi_k$ ($k \in C$) is also a binary variable that equals 1 if the content item k is cached in at least one edge computing node in the zone and is otherwise equal to 0. $\xi_{i,k}^j$ ($i, j \in S, k \in C$) is a real variable to indicate the fraction of the request load for content item k in sub-zone i that is served by the edge computing node j.

The MILP model has the following objective function:

$$\Sigma_{i \in S, k \in C}(L_1 \cdot \xi_{i,k}^i + L_2 \cdot \Sigma_{j \in S, j \neq i} \xi_{i,k}^j + L_3 \cdot (\lambda_i \cdot p_k^i - \Sigma_{j \in S} \xi_{i,k}^j)) / \Sigma_{i \in KS} \lambda_i;$$

This is subject to the following constraints:

$$\begin{cases} \sum_{k \in C} \rho_k^i \leq s_i & \forall\, i \in S & (1) \\ \psi_k \leq \sum_{i \in S} \rho_k^i \leq \psi_k \cdot \Delta & \forall\, k \in C & (2) \\ \xi_{i,k}^j \leq \rho_k^j \cdot \Delta & \forall\, k \in C;\, i, j \in S & (3) \\ \sum_{j \in S} \xi_{i,k}^j \leq \lambda_i \cdot p_k^i \cdot \psi_k & \forall\, k \in C;\, i \in S & (4) \\ \sum_{k \in C, j \in S} \xi_{j,n}^i \leq c_i & \forall\, i \in S; & (5) \end{cases}$$

In the objective, $$\lambda_i \cdot p_k^i - \sum_{j \in S} \xi_{i,k}^j$$

is the load of content item k offloaded to the large data center in the sub-zone i. Constraint (1) ensures that the storage space required to cache content items in each edge computing node does not exceed its storage capacity limit. Constraint (2) ensures that if at least one copy of content item k is cached in the zone, the variable $\psi_k$ is 1, otherwise it is 0. Constraint (3) ensures that the edge computing node j provides service only when content item k is cached therein. Constraint (4) ensures that for a content item k, the sum of its load in the sub-zone i obtained from the whole zone should not exceed its total load. Constraint (5) ensures that the total content load assigned to each edge computing node should not exceed its processing capacity.

Figure 2:
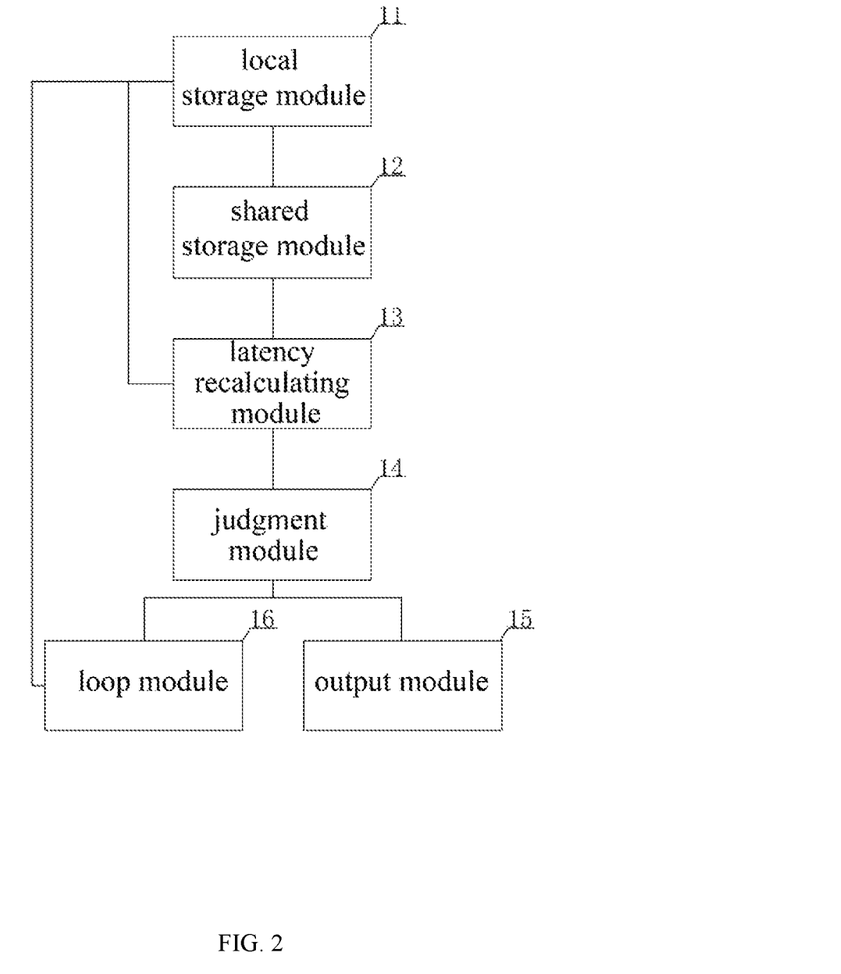
FIG. 2 shows a structure diagram of a caching system of edge computing according to an embodiment of the present invention.

An embodiment of the present invention further discloses a caching system for edge computing, as shown in FIG. 2, comprising a local storage module 11, for, firstly, ranking information data in each sub-zone from the highest to the lowest according to their popularity; and then storing the information data from the highest to the lowest according to their ranks into local sub-zone storage space in a corresponding edge computing node until it becomes full;

a shared storage module 12, for, ranking information data from the highest to the lowest according to their popularity in a whole zone of all information data in a data center, and the current information data to be cached are each stored into a selected edge computing node until all the edge computing nodes become full, wherein the selected edge computing nodes are nodes that have free zone-shared storage space and have the highest access weight for the current information data to be cached.

a latency recalculating module 13, for calculating current average delivery latency for a user accessing the information data in the current zone, and adjusting the size of the local sub-zone storage space in each edge computing node within the current zone with a preset increment value, and reloading the local storage module 11 and the shared storage module 12 successively to calculate an average delivery latency after adjustment;

a judgment module 14, for obtaining an amount of change of the average delivery latency by using the current average delivery latency and the average delivery latency after adjustment and determining whether the amount of change of the average delivery latency satisfies a preset condition;

an output module 15, for, if so, outputting the storage distribution data for the information data stored in all the edge computing nodes within the zone after adjustment;

a loop module 16, for, if not, adjusting the size of the local sub-zone storage space in each edge computing node by using the current average delivery latency and the average delivery latency after adjustment, and reloading the local storage module 11, the shared storage module 12, the latency recalculating module 13 and the judgment module 14 successively;

Each sub-zone contains an edge computing node, and each zone contains S sub-zones, wherein S is a positive integer, and the total storage space in each edge computing node includes local sub-zone storage space and zone-shared storage space. The local sub-zone storage space is predefined storage space that is smaller than the total storage space. The size of the zone-shared storage space is equal to the difference between the total storage space and the local sub-zone storage space.

It can be seen that in the embodiment of the present invention, the edge computing network is divided into multiple zones, each including multiple sub-zones. Each sub-zone corresponds to an edge computing node. Each edge computing node is divided into local sub-zone storage space and zone-shared storage space. Depending on the popularity for respective information data in respective sub-zones, the information data is cached into the local sub-zone storage space and zone-shared storage space in respective edge computing node according to a particular computing mode, in order to optimize cooperative processing of user access requests across nodes, reduce the delivery latency for the user, and maximize utilization of the processing capacity and storage space of the edge computing nodes. Finally, through constant adjustments to the size of the local sub-zone storage space and changes to the distribution of information data cached in the edge computing node, the storage distribution data for the information data cached in the edge computing node at an optimum average delivery latency for the user is obtained, so as to achieve the minimum average delivery latency for the user.

In an embodiment of the present invention, the shared storage module 12 comprises a popularity calculating unit; wherein, a popularity calculating unit, for substituting an average user request arrival rate of each edge computing node and a popularity for each information data calculated statistically for each sub-zone into an equation for calculating the zone-wide popularity to calculate the zone-wide popularity for all the information data in all data centers; wherein, an equation for calculating the zone-wide popularity is expressed as:

$$G_c = \sum_{s \in S} p_{c,s} * \lambda_s;$$

wherein $G_c$ represents the zone-wide popularity for a c-th information data, $p_{c,s}$ represents the popularity of the information data c by a user group in the sub-zone s, $\lambda_s$ represents the average user request arrival rate of the edge computing nodes in the sub-zone s, $$\sum_{c \in C} p_{c,s} = 1,$$

c∈C, s∈S, C represents the total number of information data in the data center, and S represents a total number of edge computing nodes, C and S are both positive integers.

The shared storage module 12 comprises a screening unit, an access weight calculating unit, and a saving unit; wherein, a screening unit, for screening all the edge computing nodes to find edge computing nodes having remaining free zone-shared storage space so as to obtain a candidate node set;

an access weight calculating unit, for substituting the average user request arrival rate of each edge computing node in the candidate node set and the popularity for the information data by each sub-zone into an equation for calculating an access weight to calculate the access weight for the current information data to be saved in each edge computing node in the candidate node set;

a saving unit, for storing the current information data to be saved to the edge computing node with the highest access weight, wherein the equation for calculating the access weight is expressed as $Y_{c,s} = \lambda_s * p_{c,s}$;

wherein $Y_{c,s}$ represents the access weight for the c-th information data in the sub-zone s.

The saving unit comprises:

a same weigh judging sub-unit, for determining whether there are multiple edge computing nodes with the same highest access weigh;

an access stress calculating sub-unit, for, if so, substituting the average user request arrival rate of each edge computing node and the popularity for the information data that has been stored into each edge computing node, among the multiple edge computing nodes with the same highest access weight, into an equation for calculating an access stress to calculate the access stress on each edge computing node;

a pre-estimated access stress calculating sub-unit, for substituting the access weight and the access stress on each edge computing node, among the multiple edge computing nodes with the highest access weight, into an equation for calculating a pre-estimated access stress to calculate the pre-estimated access stress on each edge computing node;

a saving sub-unit, for storing the current information data to be saved into the edge computing node with the highest access weight and the lowest pre-estimated access stress; wherein the equation for calculating the access stress is expressed as:

$$W_s = \sum_{L_{m,s}} p_{c,s} * \lambda_s, \forall s \in S;$$

the equation for calculating the pre-estimated access stress is expressed as:

$$W'_s = W_s + Y_{c,s}, \forall s \in S;$$

wherein $W_s$ represents the access stress on an edge computing node within the sub-zone s, $L_{m,s}$ represents the current set of information data stored in the edge computing node within the sub-zone s, and $W'_s$ represents the pre-estimated access stress on the edge computing node within the zone s.

The loop module 16 comprises:

a storage space refreshing unit, for substituting the current average delivery latency and the average delivery latency after adjustment into an equation for refreshing the storage space to calculate the size of the local sub-zone storage space in each edge computing node; wherein the equation for refreshing the storage space is expressed as:

$$M_2 = \left[ M_0 + \frac{\Delta m}{2} + \alpha \frac{J_{M_0} - J_{M_0 + \Delta m}}{\Delta m} \right];$$

wherein $M_2$ represents the size of the local sub-zone storage space in each edge computing node that has been adjusted by using the current average delivery latency and the adjusted average delivery latency, $M_0$ represents the size of the local sub-zone storage space in each edge computing node within the current zone, $\Delta m$ represents a preset increment value, $\alpha$ represents a preset increment coefficient, $J_{M_0}$ represents the current average delivery latency, and $J_{M_0 + \Delta m}$ represents the adjusted average delivery latency.

The present invention further discloses a caching device for edge computing, comprising:

a storage, for storing instructions, wherein the instructions comprises the following steps: Step S11: firstly, ranking information data in each sub-zone from the highest to the lowest according to their popularity; and then storing the information data from the highest to the lowest according to their ranks into local sub-zone storage space in a corresponding edge computing node until it becomes full; Step S12: ranking information data from the highest to the lowest according to their popularity in a whole zone of all information data in a data center, and the current information data to be cached are each stored into a selected edge computing node until all the edge computing nodes become full, wherein the selected edge computing nodes are nodes that have free zone-shared storage space and have the highest access weight for the current information data to be cached; Step S13: calculating current average delivery latency for a user accessing the information data in the current zone, and adjusting the size of the local sub-zone storage space in each edge computing node within the current zone with a preset increment value, and carrying out Step S11 and Step S12 again to calculate an average delivery latency after adjustment; Step S14: obtaining an amount of change of the average delivery latency by using the current average delivery latency and the average delivery latency after adjustment and determining whether the amount of change of the average delivery latency satisfies a preset condition; Step S15: if so, outputting the storage distribution data for the information data stored in all the edge computing nodes within the zone with the lowest average delivery latency; Step S16: if not, adjusting the size of the local sub-zone storage space in each edge computing node by using the current average delivery latency and the average delivery latency after adjustment, and carrying out Step S11 to Step S14 again, wherein each sub-zone contains an edge computing node, and each zone contains S sub-zones, wherein S is a positive integer, and the total storage space in each edge computing node includes local sub-zone storage space and zone-shared storage space;

a processor, for executing the instructions in the storage.

With respect to the contents of the instructions stored in the storage in the embodiment of the present invention, please see the above embodiments, which will not be repeated here.

The embodiment of the invention further discloses a computer-readable storage medium having a caching program for edge computing stored therein which, when executed by a processor, implements the steps of the caching method of edge computing described above.

Finally, it is also to be noted that as used herein, relational terms such as first and second, etc., are only used to distinguish one entity or operation from another entity or operation, and do not necessarily require or imply any such actual relationship between or sequence of these entities or operations. Moreover, the terms "comprise", "include", or any other variation thereof are intended to encompass a non-exclusive inclusion, such that a process, method, article, or apparatus that comprises a list of elements comprises not only those elements but also other elements not expressly listed or elements inherent to such a process, method, article, or apparatus. Without further limitation, an element defined by the statement "comprising a(n) . . . " does not exclude the presence of another identical element in the process, method, article, or apparatus that comprises the element.

Those skilled in the art can further realize that the units and algorithm steps of the examples described in connection with the embodiments disclosed herein can be implemented in electronic hardware, computer software, or a combination of the two. In order to clearly illustrate the interchangeability between hardware and software, the composition and steps of the examples have been generally described in terms of their functions in the above description. Whether these functions are implemented in hardware or software depends on the specific application and design constraints of the technical solution. Those skilled in the art may use different methods to implement the described functions for each particular application, but such implementation should not be considered as departure from the scope of the present invention.

The caching method, system and device of edge computing and computer readable storage medium provided by the present invention have been described in detail above. Specific examples are used herein to explain the principle and implementation of the present invention. The above embodiments are only intended to aid in understanding the method and concept of the present invention. Meanwhile, changes can be made to the specific implementations and applications by those skilled in the art based on the concept of the present invention. In summary, the disclosure in this specification should not be construed as limiting the present invention.

What is claimed is:

1. A caching method for edge computing, comprising:
Step S1: firstly, ranking information data in each sub-zone from the highest to the lowest according to their popularity; and then storing the information data from the highest to the lowest according to their ranks into local sub-zone storage space in a corresponding edge computing node until it becomes full;
Step S2: ranking the information data from the highest to the lowest according to their popularity in a whole zone of the information data, and current information data to be cached are each stored into a selected edge computing node until all edge computing nodes become full, wherein the selected edge computing nodes are nodes that have free zone-shared storage space and have the highest access weight for the current information data to be cached;
Step S3: calculating current average delivery latency for a user accessing the information data in a current zone, and adjusting a size of the local sub-zone storage space in each edge computing node within the current zone with a preset increment value, and carrying out Step S1 and Step S2 again to calculate an average delivery latency after adjustment;
Step S4: obtaining an amount of change of the average delivery latency by using the current average delivery latency and the average delivery latency after adjustment and determining whether the amount of change of the average delivery latency satisfies a preset condition;
Step S5: if the amount of change of the average delivery latency satisfies as the preset condition, outputting storage distribution data for the information data stored in all the edge computing nodes within a zone with the lowest average delivery latency;
Step S6: if the amount of change of the average delivery latency does not satisfy the preset condition, adjusting the size of the local sub-zone storage space in each edge computing node by using the current average delivery latency and the average delivery latency after adjustment, and carrying out Step S1 to Step S4 again;
wherein, each sub-zone contains an edge computing node, and each zone contains S subzones, wherein S is a positive integer, and a total storage space in each edge computing node includes local sub-zone storage space and zone-shared storage space.

2. The caching method for edge computing according to claim 1, wherein, a zone-wide popularity for all the information data in all data centers is calculated by substituting an average user request arrival rate of each edge computing node and a popularity for each information data calculated statistically for each sub-zone into an equation for calculating the zone-wide popularity expressed as:

$$G_c = \sum_{s \in S} p_{c,s} * \lambda_s;$$

wherein $G_c$ represents the zone-wide popularity for a c-th information data, $P_{c,s}$ represents the popularity of the information data c by a user group in the sub-zone s, $\lambda_s$ represents the average user request arrival rate of the edge computing nodes in the sub-zone $$s, \sum_{c \in C} p_{c,s} = 1,$$

$c \in C$, $s \in S$, C represents the total number of information data in the data center, and S represents a total number of edge computing nodes, C and S are both positive integers.

3. The caching method for edge computing according to claim 1, wherein, the process of storing each information data to be saved into a selected edge computing node comprises:
screening all the edge computing nodes to find edge computing nodes having remaining free zone-shared storage space so as to obtain a candidate node set;
substituting an average user request arrival rate of each edge-computing node in the candidate node set and the popularity for the information data by each sub-zone into an equation for calculating an access weight to calculate the access weight for the current information data to be saved in each edge computing node in the candidate node set;

storing the current information data to be saved to the edge computing node with the highest access weight, wherein the equation for calculating the access weight is expressed as $Y_{c,s}=\lambda_s * p_{c,s}$;

wherein $Y_{c,s}$ represents the access weight for the c-th information data in the sub-zone s.

4. The caching method for edge computing according to claim 3, wherein, the process of storing the current information data to be saved into the edge computing node with the highest access weight comprises:

determining whether there are a plurality of edge computing nodes with the same highest access weight;

if there are the plurality of edge computing nodes with the same highest access weight, substituting the average user request arrival rate of each edge computing node and the popularity for the information data that has been stored into each edge computing node, among the edge computing nodes with the same highest access weight, into an equation for calculating an access stress to calculate the access stress on each edge computing node;

substituting the access weight and the access stress on each edge computing node, among the plurality of edge computing nodes with the highest access weight, into an equation for calculating a pre-estimated access stress to calculate the pre-estimated access stress on each edge computing node;

storing the current information data to be saved into the edge computing node with the highest access weight and the lowest pre-estimated access stress; wherein the equation for calculating the access stress is expressed as:

$$W_s = \sum_{L_{m,s}} p_{c,s} * \lambda_s, \forall s \in S;$$

the equation for calculating the pre-estimated access stress is expressed as:

$W'_s = W_s + Y_{c,s}, \forall s \in S;$ wherein $W_s$ represents the access stress on an edge computing node within the sub-zone s, $L_{m,s}$ represents the current set of information data stored in the edge computing node within the sub-zone $s_1$ and $W'_s$ represents the pre-estimated access stress on the edge computing node within the zone s.

5. The caching method for edge computing according to claim 1, wherein, the process of adjusting the size of the local sub-zone storage space in each edge computing node by using the current average delivery latency and the average delivery latency after adjustment comprises:

substituting the current average delivery latency and the average delivery latency after adjustment into an equation for refreshing the storage space to calculate the size of the local sub-zone storage space in each edge computing node; wherein the equation for refreshing the storage space is expressed as:

$$M_2 = \left[ M_0 + \frac{\Delta m}{2} + \alpha \frac{J_{M_0} - J_{M_0+\Delta m}}{\Delta m} \right];$$

wherein $M_2$ represents the size of the local sub-zone storage space in each edge computing node that has been adjusted by using the current average delivery latency and the adjusted average delivery latency, $M_0$ represents the size of the local sub-zone storage space in each edge computing node within the current zone, $\Delta m$ represents a preset increment value, $\alpha$ represents a preset increment coefficient, $J_{M_0}$ represents the current average delivery latency, and $J_{M_0+\Delta m}$ represents the adjusted average delivery latency.

6. A caching device for edge computing, comprising:

a storage, for storing instructions, wherein the instructions comprises the following steps:

Step S1: firstly, ranking information data in each sub-zone from the highest to the lowest according to their popularity; and then storing the information data from the highest to the lowest according to their ranks into local sub-zone storage space in a corresponding edge computing node until it becomes full;

Step S2: ranking the information data from the highest to the lowest according to their popularity in a whole zone of the information data in a data center, and current information data to be cached are each stored into a selected edge computing node until all edge computing nodes become full, wherein the selected edge computing nodes are nodes that have free zone-shared storage space and have the highest access weight for the current information data to be cached;

Step S3: calculating current average delivery latency for a user accessing the information data in a current zone, and adjusting a size of the local sub-zone storage space in each edge computing node within the current zone with a preset increment value, and carrying out Step S1 and Step S2 again to calculate an average delivery latency after adjustment;

Step S4: obtaining an amount of change of the average delivery latency by using the current average delivery latency and the average delivery latency after adjustment and determining whether the amount of change of the average delivery latency satisfies a preset condition;

Step S5: if the amount of change of the average delivery latency satisfies the preset condition, outputting the storage distribution data for the information data stored in all the edge computing nodes within a zone with the lowest average delivery latency;

Step S6: if the amount of change of the average delivery latency does not satisfy the preset condition, adjusting the size of the local sub-zone storage space in each edge computing node by using the current average delivery latency and the average delivery latency after adjustment, and carrying out Step S1 to Step S4 again, wherein each subzone contains an edge computing node, and each zone contains S sub-zones, wherein S is a positive integer, and a total storage space in each edge computing node includes local sub-zone storage space and zone-shared storage space;

a processor, for executing the instructions in the storage.

* * * * *